United States Patent
Foster et al.

(10) Patent No.: US 7,602,530 B2
(45) Date of Patent: Oct. 13, 2009

(54) CREATING HIGH SPATIAL FREQUENCY HALFTONE SCREENS WITH INCREASED NUMBERS OF PRINTABLE DENSITY LEVELS

(75) Inventors: Thomas J. Foster, Geneseo, NY (US); Gregory Rombola, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 564 days.

(21) Appl. No.: 11/043,597

(22) Filed: Jan. 26, 2005

(65) Prior Publication Data
US 2006/0164659 A1    Jul. 27, 2006

(51) Int. Cl.
*G06K 15/00* (2006.01)
*H04N 1/405* (2006.01)

(52) U.S. Cl. .................... 358/3.12; 358/3.06
(58) Field of Classification Search .......... 358/1.9–3.32
See application file for complete search history.

(56) References Cited

U.S. PATENT DOCUMENTS

| | | | |
|---|---|---|---|
| 5,956,544 A | 9/1999 | Stern et al. | |
| 6,121,986 A | 9/2000 | Regelsberger et al. | |
| 6,538,677 B1 * | 3/2003 | Thompson et al. | 347/131 |
| 7,212,315 B2 * | 5/2007 | Huang et al. | 358/3.13 |
| 7,286,267 B2 * | 10/2007 | Chang | 358/3.1 |
| 2003/0038952 A1 * | 2/2003 | Matsukubo et al. | 358/1.2 |

FOREIGN PATENT DOCUMENTS

| | | |
|---|---|---|
| WO | WO 01/89194 A2 | 11/2001 |
| WO | WO 01/89194 A3 | 11/2001 |
| WO | WO 02/10860 A1 | 2/2002 |
| WO | WO 02/14957 A1 | 2/2002 |

OTHER PUBLICATIONS

Pg. 682, "Handbook of Print Media", by Helmut Kipphan, published by Springer Verlag, ISBDN 3- 540-67326-1.

* cited by examiner

*Primary Examiner*—Douglas Q Tran
(74) *Attorney, Agent, or Firm*—Robert L. Walker; Peyton C. Watkins

(57) ABSTRACT

A method of controlling a printer to print of an image, the printer having a predetermined marking material printed dot size, the method comprising the steps of rasterizing the image and defining halftone super pixels within the image, calculating the average density of the marking material within the super pixels, selecting a pattern for marking the pixels within the super pixels as a function of the printed dot size so as to expand the distribution of printed densities printable by the printer.

12 Claims, 6 Drawing Sheets

Superpixel Cell (4 X 4 pixels) 150 cells per inch at 600dpi

CREATING HIGH SPATIAL FREQUENCY HALFTONE SCREENS WITH INCREASED NUMBERS OF PRINTABLE DENSITY LEVELS

FIELD OF THE INVENTION

This invention is in the field of digital printing, and is more specifically directed to managing the rasterization of images in a digital printing system.

BACKGROUND OF THE INVENTION

Electrographic printing has become the prevalent technology for modern computer-driven printing of text and images, on a wide variety of hard copy media. This technology is also referred to as electrographic marking, electrostatographic printing or marking, and electrophotographic printing or marking. Conventional electrographic printers are well suited for high resolution and high speed printing, with resolutions of 600 dpi (dots per inch) and higher becoming available even at modest prices. As will be described below, at these resolutions, modern electrographic printers and copiers are well-suited to be digitally controlled and driven, and are thus highly compatible with computer graphics and imaging. Efforts regarding such printers or printing systems have led to continuing developments to improve their versatility practicality, and efficiency.

DETAILED DESCRIPTION

Figure 1:
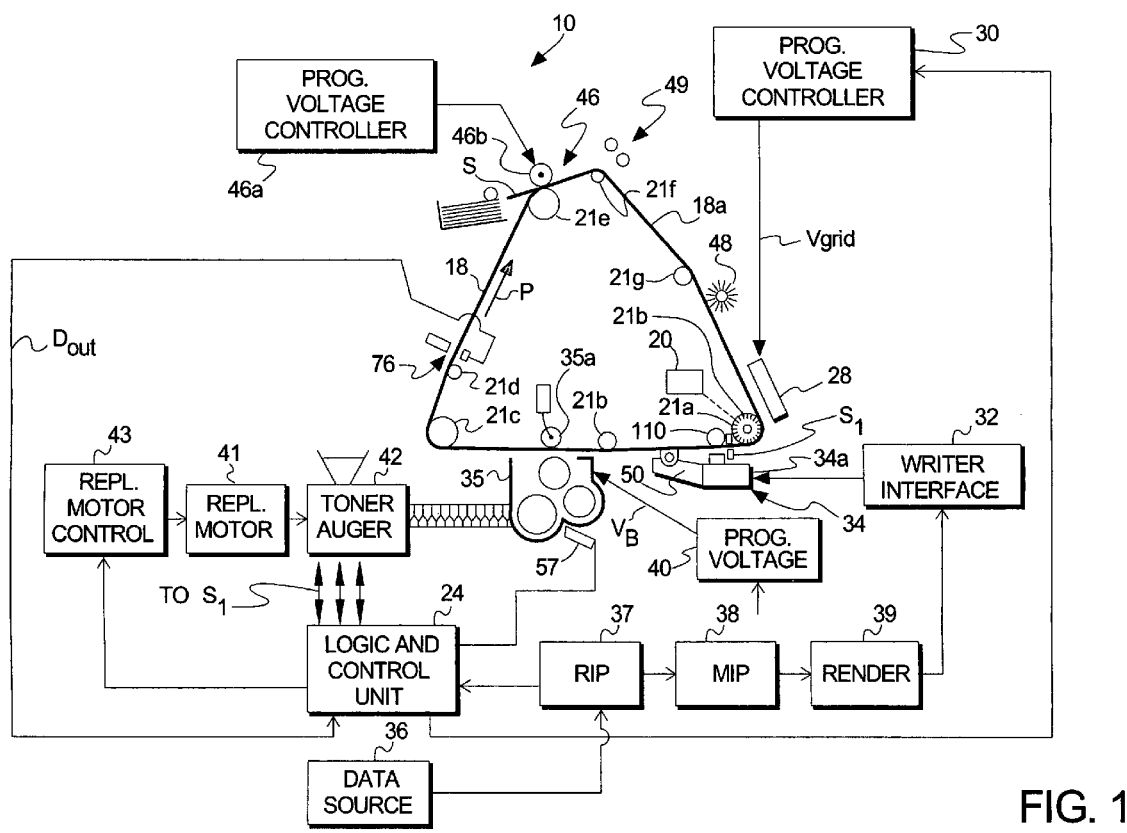
FIG. 1 is a schematic diagram of an electrographic marking or reproduction system in accordance with the present invention.

Referring to FIG. 1, a printer machine 10 includes a moving recording member such as a photoconductive belt 18 which is entrained about a plurality of rollers or other supports 21a through 21g, one or more of which is driven by a motor to advance the belt. By way of example, roller 21a is illustrated as being driven by motor 20. Motor 20 preferably advances the belt at a high speed, such as 20 inches per second or higher, in the direction indicated by arrow p, past a series of workstations of the printer machine 10. Alternatively, belt 18 may be wrapped and secured about only a single drum.

Printer machine 10 includes a controller or logic and control unit (LCU) 24, preferably a digital computer or microprocessor operating according to a stored program for sequentially actuating the workstations within printer machine 10, effecting overall control of printer machine 10 and its various subsystems. LCU 24 also is programmed to provide closed-loop control of printer machine 10 in response to signals from various sensors and encoders. Aspects of process control are described in U.S. Pat. No. 6,121,986 incorporated herein by this reference.

A primary charging station 28 in printer machine 10 sensitizes belt 18 by applying a uniform electrostatic corona charge, from high-voltage charging wires at a predetermined primary voltage, to a surface 18a of belt 18. The output of charging station 28 is regulated by a programmable voltage controller 30, which is in turn controlled by LCU 24 to adjust this primary voltage, for example by controlling the electrical potential of a grid and thus controlling movement of the corona charge. Other forms of chargers, including brush or roller chargers, may also be used.

An exposure station 34 in printer machine 10 projects light from a writer 34a to belt 18. This light selectively dissipates the electrostatic charge on photoconductive belt 18 to form a latent electrostatic image of the document to be copied or printed. Writer 34a is preferably constructed as an array of light emitting diodes (LEDs), or alternatively as another light source such as a laser or spatial light modulator. Writer 34a exposes individual picture elements (pixels) of belt 18 with light at a regulated intensity and exposure, in the manner described below. The exposing light discharges selected pixel locations of the photoconductor, so that the pattern of localized voltages across the photoconductor corresponds to the image to be printed. An image is a pattern of physical light which may include characters, words, text, and other features such as graphics, photos, etc. An image may be included in a set of one or more images, such as in images of the pages of a document. An image may be divided into segments, objects, or structures each of which is itself an image. A segment, object or structure of an image may be of any size up to and including the whole image.

After exposure, the portion of exposure medium belt 18 bearing the latent charge images travels to a development station 35. Development station 35 includes a magnetic brush in juxtaposition to the belt 18. Magnetic brush development stations are well known in the art, and are preferred in many applications; alternatively, other known types of development stations or devices may be used. Plural development stations 35 may be provided for developing images in plural grey scales, colors, or from toners of different physical characteristics. Full process color electrographic printing is accomplished by utilizing this process for each of four toner colors (e.g., black, cyan, magenta, yellow).

Upon the imaged portion of belt 18 reaching development station 35, LCU 24 selectively activates development station 35 to apply toner to belt 18 by moving backup roller 35a belt 18, into engagement with or close proximity to the magnetic brush. Alternatively, the magnetic brush may be moved toward belt 18 to selectively engage belt 18. In either case, charged toner particles on the magnetic brush are selectively attracted to the latent image patterns present on belt 18, developing those image patterns. As the exposed photoconductor passes the developing station, toner is attracted to pixel locations of the photoconductor and as a result, a pattern of toner corresponding to the image to be printed appears on the photoconductor. As known in the art, conductor portions of development station 35, such as conductive applicator cylinders, are biased to act as electrodes. The electrodes are connected to a variable supply voltage, which is regulated by programmable controller 40 in response to LCU 24, by way of which the development process is controlled.

Development station 35 may contain a two component developer mix which comprises a dry mixture of toner and carrier particles. Typically the carrier preferably comprises high coercivity (hard magnetic) ferrite particles. As an example, the carrier particles have a volume-weighted diameter of approximately 30 μ. The dry toner particles are substantially smaller, on the order of 6 μ to 15 μ in volume-weighted diameter. Development station 35 may include an applicator having a rotatable magnetic core within a shell, which also may be rotatably driven by a motor or other suitable driving means. Relative rotation of the core and shell moves the developer through a development zone in the presence of an electrical field. In the course of development, the toner selectively electrostatically adheres to photoconductive belt 18 to develop the electrostatic images thereon and the carrier material remains at development station 35. As toner is depleted from the development station due to the development of the electrostatic image, additional toner is periodically introduced by toner auger 42 into development station 35 to be mixed with the carrier particles to maintain a uniform amount of development mixture. This development mixture is controlled in accordance with various development control processes. Single component developer stations, as well as conventional liquid toner development stations, may also be used.

A transfer station 46 in printing machine 10 moves a receiver sheet S into engagement with photoconductive belt 18, in registration with a developed image to transfer the developed image to receiver sheet S. Receiver sheets S may be plain or coated paper, plastic, or another medium capable of being handled by printer machine 10. Typically, transfer station 46 includes a charging device for electrostatically biasing movement of the toner particles from belt 18 to receiver sheet S. In this example, the biasing device is roller 46b, which engages the back of sheet S and which is connected to programmable voltage controller 46a that operates in a constant current mode during transfer. Alternatively, an intermediate member may have the image transferred to it and the image may then be transferred to receiver sheet S. After transfer of the toner image to receiver sheet S, sheet S is detacked from belt 18 and transported to fuser station 49 where the image is fixed onto sheet S, typically by the application of heat. Alternatively, the image may be fixed to sheet S at the time of transfer. A cleaning station 48, such as a brush, blade, or web is also located behind transfer station 46, and removes residual toner from belt 18. A pre-clean charger (not shown) may be located before or at cleaning station 48 to assist in this cleaning. After cleaning, this portion of belt 18 is then ready for recharging and re-exposure. Of course, other portions of belt 18 are simultaneously located at the various workstations of printing machine 10, so that the printing process is carried out in a substantially continuous manner.

LCU 24 provides overall control of the apparatus and its various subsystems as is well known. LCU 24 will typically include temporary data storage memory, a central processing unit, timing and cycle control unit, and stored program control. Data input and output is performed sequentially through or under program control. Input data can be applied through input signal buffers to an input data processor, or through an interrupt signal processor, and include input signals from various switches, sensors, and analog-to-digital converters internal to printing machine 10, or received from sources external to printing machine 10, such as from a human user or a network control. The output data and control signals from LCU 24 are applied directly or through storage latches to suitable output drivers and in turn to the appropriate subsystems within printing machine 10.

Process control strategies generally utilize various sensors to provide real-time closed-loop control of the electrostatographic process so that printing machine 10 generates "constant" image quality output, from the user's perspective. Real-time process control is necessary in electrographic printing, to account for changes in the environmental ambient of the photographic printer, and for changes in the operating conditions of the printer that occur over time during operation (rest/run effects). An important environmental condition parameter requiring process control is relative humidity, because changes in relative humidity affect the charge-to-mass ratio q/m of toner particles. The ratio q/m directly determines the density of toner that adheres to the photoconductor during development, and thus directly affects the density of the resulting image. System changes that can occur over time include changes due to aging of the printhead (exposure station), changes in the concentration of magnetic carrier particles in the toner as the toner is depleted through use, changes in the mechanical position of primary charger elements, aging of the photoconductor, variability in the manufacture of electrical components and of the photoconductor, change in conditions as the printer warms up after power-on, triboelectric charging of the toner, and other changes in electrographic process conditions. Because of these effects and the high resolution of modern electrographic printing, the process control techniques have become quite complex.

Process control sensor may be a densitometer 76, which monitors test patches that are exposed and developed in non-image areas of photoconductive belt 18 under the control of LCU 24. Densitometer 76 measures the density of the test patches, which is compared to a target density. Densitometer may include an infrared or visible light led, which either shines through the belt or is reflected by the belt onto a photodiode in densitometer 76. These toned test patches are exposed to varying toner density levels, including full density and various intermediate densities, so that the actual density of toner in the patch can be compared with the desired density of toner as indicated by the various control voltages and signals. These densitometer measurements are used to control primary charging voltage Vo, maximum exposure light intensity Eo, and development station electrode bias Vb. In addition, the process control of a toner replenishment control signal value or a toner concentration setpoint value to maintain the charge-to-mass ratio q/m at a level that avoids dusting or hollow character formation due to low toner charge, and also avoids breakdown and transfer mottle due to high toner charge for improved accuracy in the process control of printing machine 10. The toned test patches are formed in the interframe area of belt 18 so that the process control can be carried out in real time without reducing the printed output throughput. Another sensor useful for monitoring process parameters in printer machine 10 is electrometer probe 50, mounted downstream of the corona charging station 28 relative to direction P of the movement of belt 18. An example of an electrometer is described in U.S. Pat. No. 5,956,544 incorporated herein by this reference.

Figure 2:
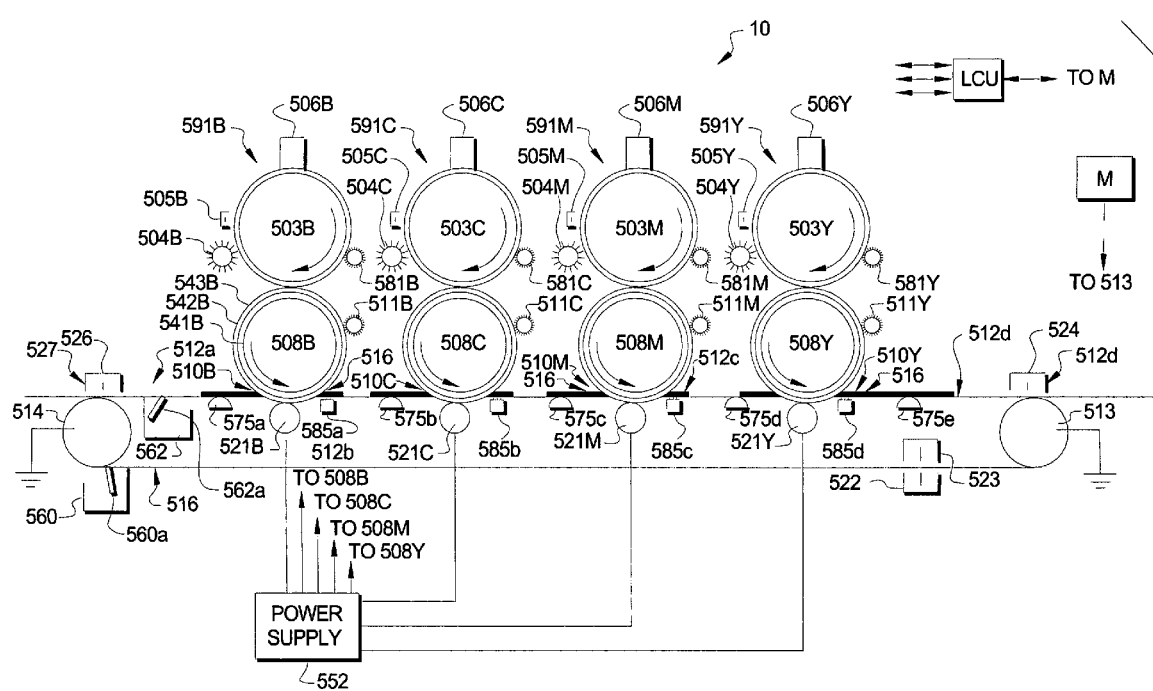
FIG. 2 is a schematic diagram of an electrographic marking or reproduction system in accordance with the present invention.

FIG. 2 shows an image forming reproduction apparatus according to another embodiment of the invention and designated generally by the numeral 10'. The reproduction apparatus 10' is in the form of an electrophotographic reproduction apparatus and more particularly a color reproduction apparatus wherein color separation images are formed in each of four color modules (591B, 591C, 591M, 591Y) and transferred in register to a receiver member as a receiver member is moved through the apparatus while supported on a paper transport web (PTW) 516. More or less than four color modules may be utilized.

Each module is of similar construction except that as shown one paper transport web 516 which may be in the form of an endless belt operates with all the modules and the receiver member is transported by the PTW 516 from module to module. The elements in FIG. 2 that are similar from module to module have similar reference numerals with a suffix of B, C, M and Y referring to the color module to which it is associated; i.e., black, cyan, magenta and yellow, respectively. Four receiver members or sheets 512a, b, c and d are shown simultaneously receiving images from the different modules, it being understood as noted above that each receiver member may receive one color image from each module and that in this example up to four color images can be received by each receiver member. The movement of the receiver member with the PTW 516 is such that each color image transferred to the receiver member at the transfer nip of each module is a transfer that is registered with the previous color transfer so that a four-color image formed on the receiver member has the colors in registered superposed relationship on the receiver member. The receiver members are then serially detacked from the PTW and sent to a fusing station (not shown) to fuse or fix the dry toner images to the receiver member. The PTW is reconditioned for reuse by providing charge to both surfaces using, for example, opposed corona chargers 522, 523 which neutralize charge on the two surfaces of the PTW.

Each color module includes a primary image-forming member (PIFM), for example a rotating drum 503B, C, M and Y, respectively. The drums rotate in the directions shown by the arrows and about their respective axes. Each PIFM 503B, C, M and Y has a photoconductive surface, upon which a pigmented marking particle image, or a series of different color marking particle images, is formed. In order to form images, the outer surface of the PIFM is uniformly charged by a primary charger such as a corona charging device 505 B, C, M and Y, respectively or other suitable charger such as roller chargers, brush chargers, etc. The uniformly charged surface is exposed by suitable exposure means, such as for example a laser 506 B, C, M and Y, respectively or more preferably an LED or other electro-optical exposure device or even an optical exposure device to selectively alter the charge on the surface of the PIFM to create an electrostatic latent image corresponding to an image to be reproduced. The electrostatic image is developed by application of pigmented charged marking particles to the latent image bearing photoconductive drum by a development station 581 B, C, M and Y, respectively. The development station has a particular color of pigmented toner marking particles associated respectively therewith. Thus, each module creates a series of different color marking particle images on the respective photoconductive drum. In lieu of a photoconductive drum which is preferred, a photoconductive belt may be used.

Electrophotographic recording is described herein for exemplary purposes only. For example, there may be used electrographic recording of each primary color image using stylus recorders or other known recording methods for recording a toner image on a dielectric member that is to be transferred electrostatically as described herein. Broadly, the primary image is formed using electrostatography. In addition, the present invention applies to other printing systems as well, such as inkjet, thermal printing, etc.

Each marking particle image formed on a respective PIFM is transferred electrostatically to an outer surface of a respective secondary or intermediate image transfer member (ITM), for example, an intermediate transfer drum 508 B, C, M and Y, respectively. The PIFMs are each caused to rotate about their respective axes by frictional engagement with a respective ITM. The arrows in the ITMs indicate the directions of rotations. After transfer the toner image is cleaned from the surface of the photoconductive drum by a suitable cleaning device 504 B, C, M and Y, respectively to prepare the surface for reuse for forming subsequent toner images. The intermediate transfer drum or ITM preferably includes a metallic (such as aluminum) conductive core 541 B, C, M and Y, respectively and a compliant blanket layer 543 B, C, M and Y, respectively. The cores 541 C, M and Y and the blanket layers 543 C, M and Y are shown but not identified in FIG. 2 but correspond to similar structure shown and identified for module 591B. The compliant layer is formed of an elastomer such as polyurethane or other materials well noted in the published literature. The elastomer has been doped with sufficient conductive material (such as antistatic particles, ionic conducting materials, or electrically conducting dopants) to have a relatively low resistivity. With such a relatively conductive intermediate image transfer member drum, transfer of the single color marking particle images to the surface of the ITM can be accomplished with a relatively narrow nip width and a relatively modest potential of suitable polarity applied by a constant voltage potential source (not shown). Different levels of constant voltage can be provided to the different ITMs so that the constant voltage on one ITM differs from that of another ITM in the apparatus.

A single color marking particle image respectively formed on the surface 542B (others not identified) of each intermediate image transfer member drum, is transferred to a toner image receiving surface of a receiver member, which is fed into a nip between the intermediate image transfer member drum and a transfer backing roller (TBR) 521B, C, M and Y, respectively, that is suitably electrically biased by a constant current power supply 552 to induce the charged toner particle image to electrostatically transfer to a receiver sheet. Each TBR is provided with a respective constant current by power supply 552. The transfer backing roller or TBR preferably includes a metallic (such as aluminum) conductive core and a compliant blanket layer. Although a resistive blanket is preferred, the TBR may be a conductive roller made of aluminum or other metal. The receiver member is fed from a suitable receiver member supply (not shown) and is suitably "tacked" to the PTW 516 and moves serially into each of the nips 510B, C, M and Y where it receives the respective marking particle image in suitable registered relationship to form a composite multicolor image. As is well known, the colored pigments can overlie one another to form areas of colors different from that of the pigments. The receiver member exits the last nip and is transported by a suitable transport mechanism (not shown) to a fuser where the marking particle image is fixed to the receiver member by application of heat and/or pressure and, preferably both. A detack charger 524 may be provided to deposit a neutralizing charge on the receiver member to facilitate separation of the receiver member from the belt 516. The receiver member with the fixed marking particle image is then transported to a remote location for operator retrieval. The respective ITMs are each cleaned by a respective cleaning device 511B, C, M and Y to prepare it for reuse. Although the ITM is preferred to be a drum, a belt may be used instead as an ITM.

Appropriate sensors such as mechanical, electrical, or optical sensors described hereinbefore are utilized in the reproduction apparatus 10' to provide control signals for the apparatus. Such sensors are located along the receiver member travel path between the receiver member supply through the various nips to the fuser. Further sensors may be associated with the primary image forming member photoconductive drum, the intermediate image transfer member drum, the transfer backing member, and various image processing stations. As such, the sensors detect the location of a receiver member in its travel path, and the position of the primary image forming member photoconductive drum in relation to the image forming processing stations, and respectively produce appropriate signals indicative thereof. Such signals are fed as input information to a logic and control unit LCU including a microprocessor, for example. Based on such signals and a suitable program for the microprocessor, the control unit LCU produces signals to control the timing operation of the various electrostatographic process stations for carrying out the reproduction process and to control drive by motor M of the various drums and belts. The production of a program for a number of commercially available microprocessors, which are suitable for use with the invention, is a conventional skill well understood in the art. The particular details of any such program would, of course, depend on the architecture of the designated microprocessor.

The receiver members utilized with the reproduction apparatus 10 can vary substantially. For example, they can be thin or thick paper stock (coated or uncoated) or transparency stock. As the thickness and/or resistivity of the receiver member stock varies, the resulting change in impedance affects the electric field used in the nips 510B, C, M, Y to urge transfer of the marking particles to the receiver members. Moreover, a variation in relative humidity will vary the conductivity of a paper receiver member, which also affects the impedance and hence changes the transfer field. To overcome these problems, the paper transport belt preferably includes certain characteristics.

The endless belt or web (PTW) 516 is preferably comprised of a material having a bulk electrical resistivity. This bulk resistivity is the resistivity of at least one layer if the belt is a multilayer article. The web material may be of any of a variety of flexible materials such as a fluorinated copolymer (such as polyvinylidene fluoride), polycarbonate, polyurethane, polyethylene terephthalate, polyimides (such as Kapton™), polyethylene napthoate, or silicone rubber. Whichever material that is used, such web material may contain an additive, such as an anti-stat (e.g. metal salts) or small conductive particles (e.g. carbon), to impart the desired resistivity for the web. When materials with high resistivity are used additional corona charger(s) may be needed to discharge any residual charge remaining on the web once the receiver member has been removed. The belt may have an additional conducting layer beneath the resistive layer which is electrically biased to urge marking particle image transfer. Also acceptable is to have an arrangement without the conducting layer and instead apply the transfer bias through either one or more of the support rollers or with a corona charger. It is also envisioned that the invention applies to an electrostatographic color machine wherein a generally continuous paper web receiver is utilized and the need for a separate paper transport web is not required. Such continuous webs are usually supplied from a roll of paper that is supported to allow unwinding of the paper from the roll as the paper passes as a generally continuous sheet through the apparatus.

In feeding a receiver member onto belt 516, charge may be provided on the receiver member by charger 526 to electrostatically attract the receiver member and "tack" it to the belt 516. A blade 527 associated with the charger 526 may be provided to press the receiver member onto the belt and remove any air entrained between the receiver member and the belt.

A receiver member may be engaged at times in more than one image transfer nip and preferably is not in the fuser nip and an image transfer nip simultaneously. The path of the receiver member for serially receiving in transfer the various different color images is generally straight facilitating use with receiver members of different thicknesses.

The endless paper transport web (PTW) 516 is entrained about a plurality of support members. For example, as shown in FIG. 2, the plurality of support members are rollers 513, 514 with preferably roller 513 being driven as shown by motor M to drive the PTW (of course, other support members such as skis or bars would be suitable for use with this invention). Drive to the PTW can frictionally drive the ITMs to rotate the ITMs which in turn causes the PIFMs to be rotated, or additional drives may be provided. The process speed is determined by the velocity of the PTW.

Alternatively, direct transfer of each image may be made directly from respective photoconductive drums to the receiver sheet as the receiver sheet serially advances through the transfer stations while supported by the paper transport web without ITMs. The respective toned color separation images are transferred in registered relationship to a receiver member as the receiver member serially travels or advances from module to module receiving in transfer at each transfer nip a respective toner color separation image. Either way, different receiver sheets may be located in different nips simultaneously and at times one receiver sheet may be located in two adjacent nips simultaneously, it being appreciated that the timing of image creation and respective transfers to the receiver sheet is such that proper transfer of images are made so that respective images are transferred in register and as expected.

Figure 3:
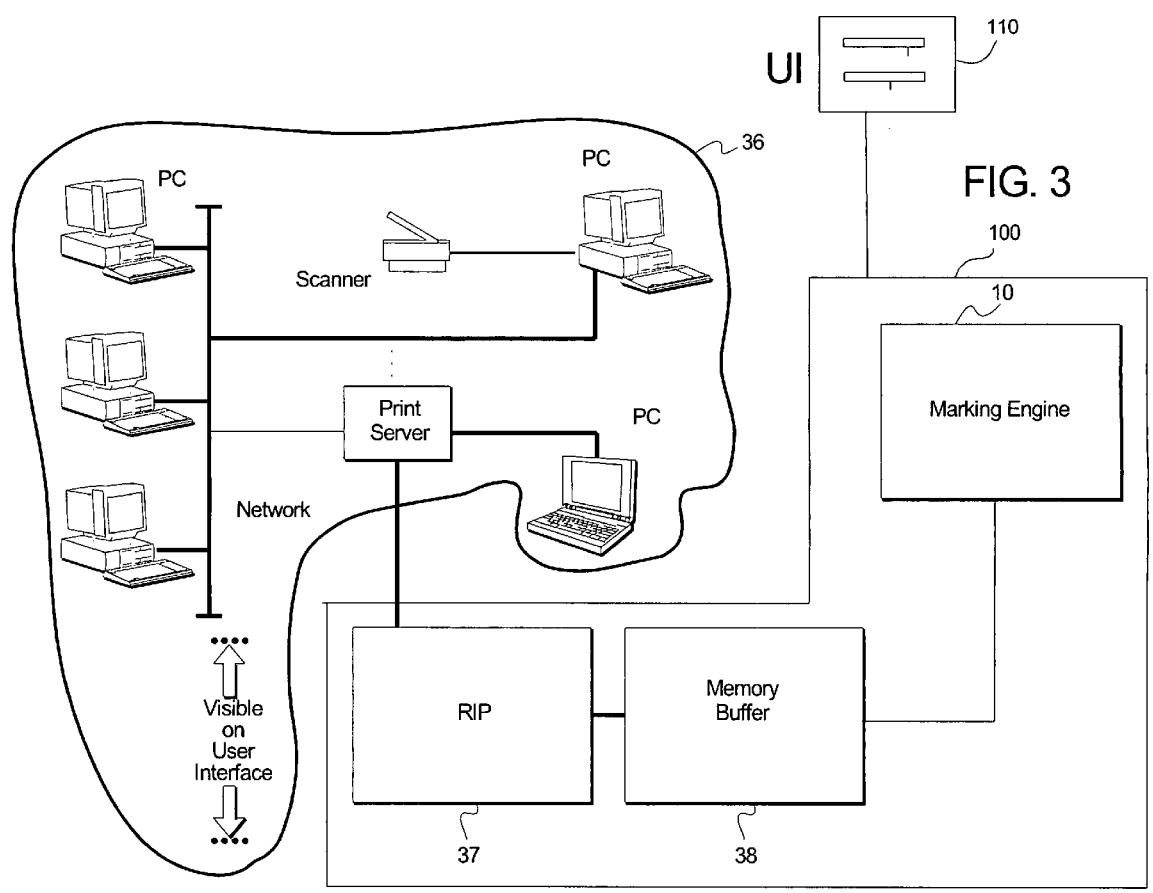
FIG. 3 is a schematic diagram of an electrographic marking or reproduction system in accordance with the present invention.

Other approaches to electrographic printing process control may be utilized, such as those described in international publication number WO 02/10860 A1, and international publication number WO 02/14957 A1, both commonly assigned herewith and incorporated herein by this reference. Referring to FIG. 3, image data to be printed is provided by an image data source 36, which is a device that can provide digital data defining a version of the image. Such types of devices are numerous and include computer or microcontroller, computer workstation, scanner, digital camera, etc. Multiple devices may be interconnected on a network. These image data sources are at the front end and generally include an application program that is used to create or find an image to output. The application program sends the image to a device driver, which serves as an interface between the client and the marking device.

The device driver then encodes the image in a format that serves to describe what image is to be generated on a page. For instance, a suitable format is page description language ("PDL"). The device driver sends the encoded image to the marking device. This data represents the location, color, and intensity of each pixel that is exposed. Signals from data source 36, in combination with control signals from LCU 24 are provided to a raster image processor (RIP) 37 for rasterization.

In general, the major roles of the RIP 37 are to: receive job information from the server; parse the header from the print job and determine the printing and finishing requirements of the job; analyze the PDL (page description language) to reflect any job or page requirements that were not stated in the header; resolve any conflicts between the requirements of the job and the marking engine configuration (i.e., RIP time mismatch resolution); keep accounting record and error logs and provide this information to any subsystem, upon request; communicate image transfer requirements to the marking engine; translate the data from PDL (page description language) to raster for printing; and support diagnostics communication between user applications. The RIP accepts a print job in the form of a page description language (PDL) such as postscript, PDF or PCL and converts it into raster, or grid of lines or form that the marking engine can accept. The PDL file received at the RIP describes the layout of the document as it was created on the host computer used by the customer. This conversion process is also called rasterization as well as ripping. The RIP makes the decision on how to process the document based on what PDL the document is described in. It reaches this decision by looking at the beginning data of the document, or document header.

Raster image processing or ripping begins with a page description generated by the computer application used to produce the desired image. The raster image processor interprets this page description into a display list of objects. This display list contains a descriptor for each text and non-text object to be printed; in the case of text, the descriptor specifies each text character, its font, and its location on the page. For example, the contents of a word processing document with styled text is translated by the RIP into serial printer instructions that include, for the example of a binary black printer, a bit for each pixel location indicating whether that pixel is to be black or white. Binary print means an image is converted to a digital array of pixels, each pixel having a value assigned to it, and wherein the digital value of every pixel is represented by only two possible numbers, either a one or a zero. The digital image in such a case is known as a binary image. Multi-bit images, alternatively, are represented by a digital array of pixels, wherein the pixels have assigned values of more than two number possibilities. The RIP renders the display list into a "contone" (continuous tone) byte map for the page to be printed. This contone byte map represents each pixel location on the page to be printed by a density level (typically eight bits, or one byte, for a byte map rendering) for each color to be printed. Black text is generally represented by a full density value (255, for an eight bit rendering) for each pixel within the character. The byte map typically contains more information than can be used by the printer. Finally, the RIP rasterizes the byte map into a bit map for use by the printer. Halftone densities are formed by the application of a halftone "screen" to the byte map, especially in the case of image objects to be printed. Pre-press adjustments can include the selection of the particular halftone screens to be applied, for example to adjust the contrast of the resulting image.

Electrographic printers with gray scale printheads are also known, as described in international publication number WO 01/89194 A2, incorporated herein by this reference. The ripping algorithm groups adjacent pixels into sets of adjacent cells, each cell corresponding to a halftone dot of the image to be printed. The gray tones are printed by increasing the level of exposure of each pixel in the cell, by increasing the duration by way of which a corresponding led in the printhead is kept on, and by "growing" the exposure into adjacent pixels within the cell.

The digital print system quantizes images both spatially and tonally. A two dimensional image is represented by an array of discrete picture elements or pixels, and the color of each pixel is in turn represented by a plurality of discrete tone or shade values (usually an integer between 0 and 255) which correspond to the color components of the pixel: either a set of red, green and blue (RGB) values, or a set of yellow, magenta, cyan, and black (YMCK) values that will be used to control the amount of ink used by a printer.

Once the document has been ripped by one of the interpreters, the raster data goes to a page buffer memory (PBM) 38 or cache via a data bus. The PBM eventually sends the ripped print job information to the marking engine 10. The PBM functionally replaces recirculating feeders on optical copiers. This means that images are not mechanically rescanned within jobs that require rescanning, but rather, images are electronically retrieved from the PBM to replace the rescan process. The PBM accepts digital image input and stores it for a limited time so it can be retrieved and printed to complete the job as needed. The PBM consists of memory for storing digital image input received from the rip. Once the images are in memory, they can be repeatedly read from memory and output to the print engine. The amount of memory required to store a given number of images can be reduced by compressing the images; therefore, the images may be compressed prior to memory storage, then decompressed while being read from memory. RIP 37, memory buffer 38, render circuit 39 and marking engine 10 may all be provided in single mainframe 100, having a local user. Interface 110 (UI) for operating the system from close proximity.

As described hereinbefore, the RIP provides image data to a render circuit 39. The RIP 37 and render circuit 39 can be dedicated hardware, or a software routine such as a printer driver, or some combination of both, for accomplishing this task.

Binary halftone screens typically need ~60 unique gray levels to provide smooth density transitions without contouring appearing in the printed images. The normally used calculation for number of gray levels in a halftone screen is $$G=\{A/L\}^2 *(g-1)+1$$

where
G=number of gray levels
A=pixels per inch (Addressability)
L=lines per inch of the screen
g=number of gray levels per pixel (minimum=2 for a binary system)
(from pg. 682, "Handbook of Print Media", by Helmut Kipphan, published by Springer Verlag, ISBDN 3-540-67326-1)

Using this calculation, a 150 lpi halftone screen (L=150) with a 600×600 dpi binary Writer (A=600, g=2), the number of gray levels available is 17, which is low for high quality printed images. Printing larger dots than the pixel grid in different arrangements within the halftone screen cell (a halftone superpixel) provides different printed areas that do not have the same average density. Thus, more than seventeen levels of gray can be printed, yielding a much higher quality printed image. By adjusting the size and arrangements of the printed spots in halftone supercells in the printing process, the number of printable gray levels can be increased (for example, from 17 to more than 65).

Figure 4:
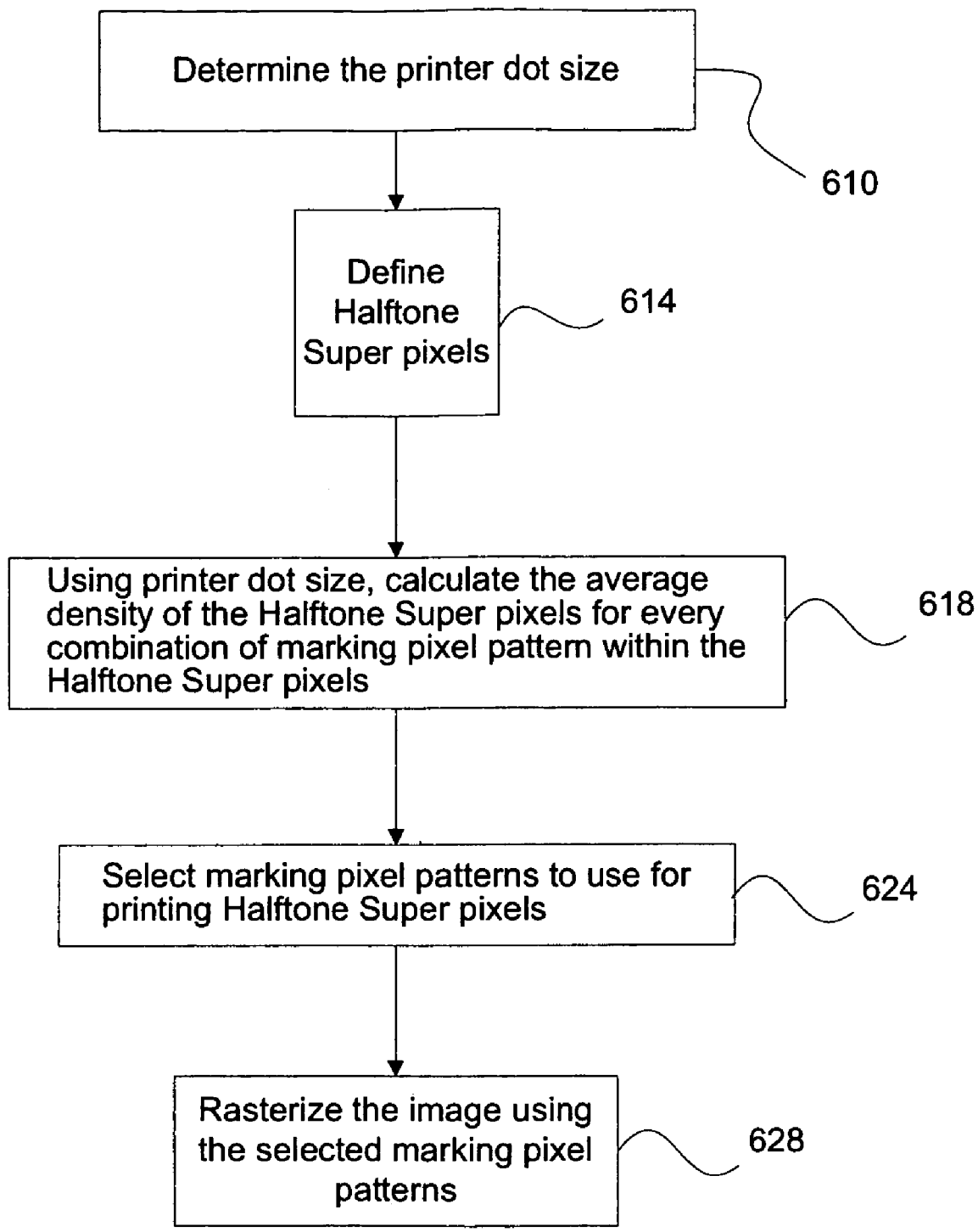
FIG. 4 is a flow chart representation of a rendering algorithm in accordance with the present invention.

FIG. 4 illustrates a flow chart in accordance with the present invention. A step 610 determines the printer dot size. Halftone Super Pixels (HSP) are defined in a step 614. In a step 618, the average marking density of the HSP's is calculated for every marking pixel pattern combination within the HSP's using dot size. In a step 624, the marking pixel patterns for the HSP's are selected. In a step 628, the image is rasterized and the selected marking pixel patterns selected in step 624 are utilized when the image is printed.

Figure 5:
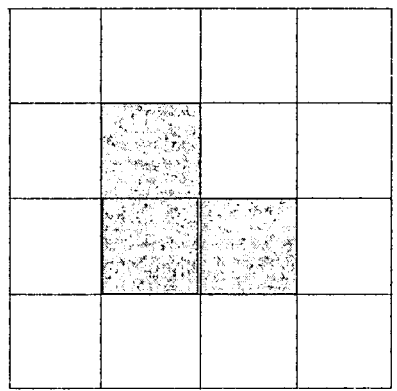
FIG. 5 is a schematic diagram of five super pixels with certain pixels marked in accordance with the present invention.
Figure 5:
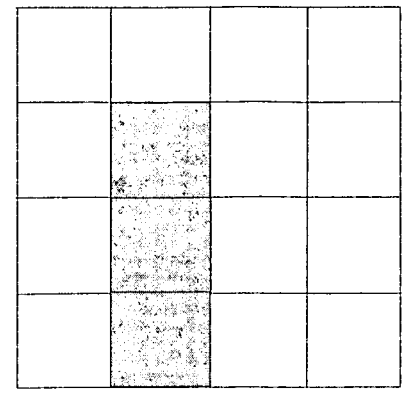
Figure 5:
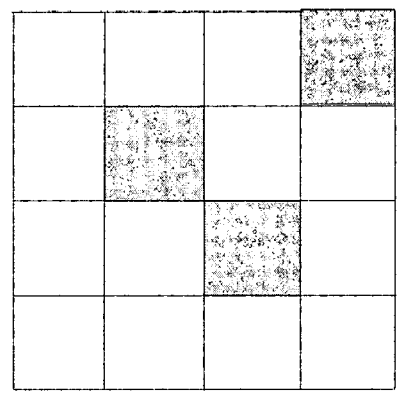
Figure 5:
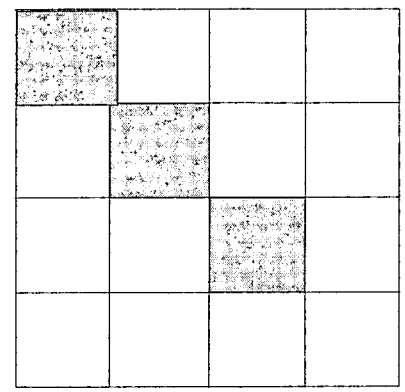
Figure 5:
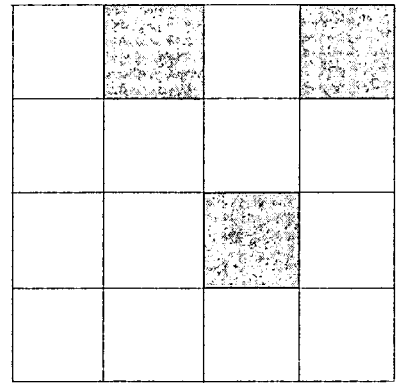
Figure 5:
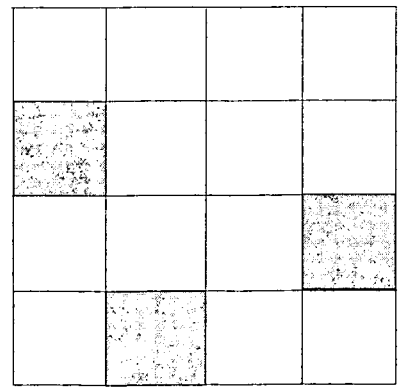
Figure 6A:
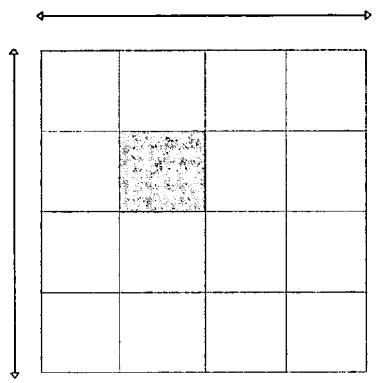
FIGS. 6a-6b are schematic diagrams of super pixels with certain pixels marked in accordance with the present invention.
Figure 6B:
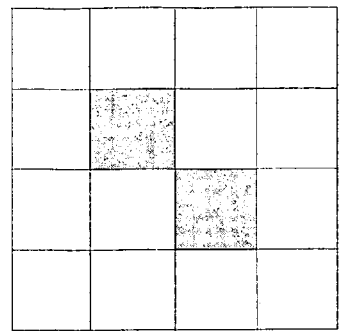
Figure 7A:
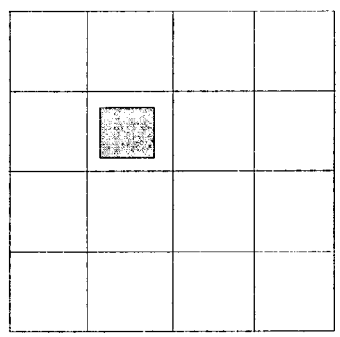
FIGS. 7a-7b are schematic diagrams of super pixels with certain pixels marked in accordance with the present invention.
Figure 7B:
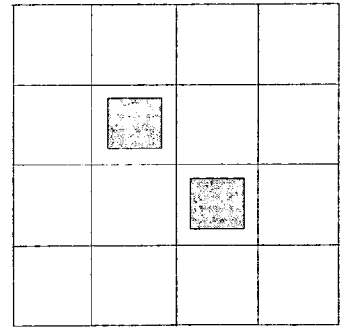
Figure 8A:
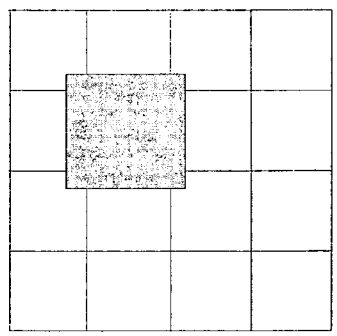
FIGS. 8a-8c are schematic diagrams of super pixels with certain pixels marked in accordance with the present invention.
Figure 8B:
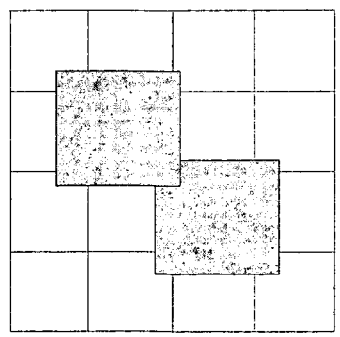
Figure 8C:
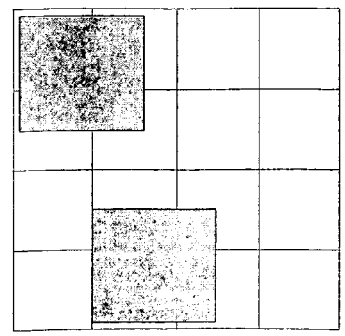

FIG. 5 illustrates five examples of how three marked pixels can be arranged within a super pixel grid. It can be seen that other arrangements (not shown) are also possible. Different arrangements of the same number of marked pixels within a halftone screen cell or super pixel do not have the same printed area, and thus do not have the same average density. This means that a greater number of gray levels can be printed, yielding a much higher quality printed image. By adjusting the size of the printed spot in the printing process, the number of printable gray levels can be increased dramatically because of a printer's printable spot size, different configurations within the superpixel having the same number of marked pixels have significantly different print coverage resulting in different densities after printing. Using this property, significantly higher number of gray levels can be printed (than predicted by the total number of pixels/superpixel), creating the potential for higher quality printing (more gray levels at the same spatial frequency). This all occurs in the rendering circuit during or after the RIP function and would be device specific as to the preferred implementation. By applying post-RIP processing the number of gray levels printed can be distributed more uniformly across the entire range of printable densities, giving much higher perceived image quality.

FIGS. 6a-6d illustrate pixel gray level adjustments also in accordance with the present invention. It can be seen that the higher the marking value of the pixel, the larger the pixel grows, and the lower the marking value, the smaller the pixel gets.

The present invention may be used in any type of digital printing system, such as electrostatographic, electrophotographic, inkjet, laser jet, etc. of any size or capacity in which pixel exposure adjustment value is selected prior to printing.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

What is claimed is:

1. A method of controlling a printer to print of an image, the printer having a predetermined marking material printed dot size, the method comprising the steps of:

rasterizing the image and defining halftone super pixels within the rasterized image; wherein each super pixel is a matrix of pixels of said predetermined dot size;

calculating the average density of the marking material within the super pixels;

selecting a printed dot size larger or smaller than said predetermined dot size and selecting a pattern from a plurality of patterns for marking the pixels within the super pixels as a function of the selected printed dot size so as to expand the distribution of printed densities printable by the printer.

2. A method in accordance with claim 1, wherein the image is a binary image.

3. A method in accordance with claim 1, wherein the image is a multi-bit image.

4. A method in accordance with claim 1, further comprising reassigning the marking value of one or more of the marked pixels.

5. A method of printing an image with a printer having a predetermined marking material printed dot size comprising the steps of:

converting the image into a digital bitmap comprised of an array of pixels wherein each pixel is assigned a digital value representing marking information;

defining halftone super pixels; wherein each super pixel is a matrix of pixels of said predetermined dot size;

calculating the average density of the marking information within the super pixel;

selecting a printed dot size larger or smaller than said predetermined dot size and selecting a pattern from a plurality of patterns for marking the pixels within the super pixel as a function of the selected printed dot size so as to expand the distribution of printed densities printable by the printer.

6. A method in accordance with claim 5, wherein the image is a binary image.

7. A method in accordance with claim 5, wherein the image is a multi-bit image.

8. A method in accordance with claim 5, further comprising reassigning the digital value of one or more of the marked pixels.

9. An apparatus for printing an image, comprising: a printer having a predetermined marking material printed dot size; means for rasterizing the image: means for defining halftone super pixels within the rasterized image; wherein each super pixel is a matrix of pixels of said predetermined dot size; means for calculating the average density of the marking material within the super pixels; and means for selecting a printed dot size larger or smaller than said predetermined dot size and for selecting a pattern from a plurality of patterns for marking the pixels within the super pixels as a function of the selected printed dot size so as to expand the distribution of printed densities printable by the printer.

10. An apparatus in accordance with claim 9, wherein the image is a binary image.

11. An apparatus in accordance with claim 9, wherein the image is a multi-bit image.

12. An apparatus in accordance with claim 9, including means for reassigning the digital value of one or more of the marked pixels.

* * * * *